(12) United States Patent
Mizumoto

(10) Patent No.: US 6,738,217 B2
(45) Date of Patent: May 18, 2004

(54) METHOD AND APPARATUS FOR CONTROLLING ACCESS TO DISK UPON DETECTION OF CONDENSATION

(75) Inventor: Kazuhiro Mizumoto, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/234,833

(22) Filed: Sep. 5, 2002

(65) Prior Publication Data

US 2003/0117740 A1 Jun. 26, 2003

(30) Foreign Application Priority Data

Dec. 25, 2001 (JP) ........................ 2001-392673

(51) Int. Cl.⁷ ............................................. G11B 21/02
(52) U.S. Cl. ........................................................ 360/75
(58) Field of Search ............................ 360/75, 71, 60, 360/128, 97.02

(56) References Cited

U.S. PATENT DOCUMENTS

| | | | | |
|---|---|---|---|---|
| 5,341,262 A | * | 8/1994 | Yamasaki et al. | ............ 360/128 |
| 5,809,826 A | * | 9/1998 | Baker, Jr. | ................. 73/75 |
| 6,108,155 A | * | 8/2000 | Tanaka et al. | ................ 360/71 |
| 6,335,843 B2 | * | 1/2002 | Yotsuya et al. | ............... 360/60 |
| 6,515,815 B2 | * | 2/2003 | Yotsuya et al. | ............... 360/60 |
| 2001/0012170 A1 | | 8/2001 | Yotsuya et al. | |
| 2002/0080512 A1 | | 6/2002 | Yotsuya et al. | |

FOREIGN PATENT DOCUMENTS

| | | | | |
|---|---|---|---|---|
| JP | 59-033676 | * | 2/1984 | ........... G11B/21/12 |
| JP | 59-154670 | * | 9/1984 | ........... G11B/19/04 |
| JP | 60-147966 | * | 8/1985 | ........... G11B/19/00 |
| JP | 63-201947 | * | 8/1988 | ........... G11B/19/02 |
| JP | 03-005248 | * | 1/1991 | ........... B60K/41/06 |
| JP | 5-342839 | | 12/1993 | |
| JP | 05-342839 | * | 12/1993 | ........... G11B/33/14 |
| JP | 08-055418 | * | 2/1996 | ........... G11B/19/04 |
| JP | 8-77766 | | 3/1996 | |
| JP | 10-162493 | * | 6/1998 | ........... G11B/19/04 |
| JP | 10-320902 | * | 12/1998 | ........... G11B/19/04 |
| JP | 11-176068 | * | 7/1999 | ........... G11B/19/04 |
| JP | 11-213525 | * | 8/1999 | ........... G11B/19/04 |
| JP | 2000-113563 | * | 4/2000 | ........... G11B/19/02 |
| JP | 2000-207816 | * | 7/2000 | ........... G11B/19/04 |

* cited by examiner

*Primary Examiner*—David Hudspeth
*Assistant Examiner*—Fred F. Tzeng
(74) *Attorney, Agent, or Firm*—Pillsbury Winthrop LLP

(57) ABSTRACT

From the detection result of a condensation sensor, a CPU determines whether condensation has occurred in a disk drive. The CPU waits for a predetermined period of time if it determines that condensation has occurred. After the predetermined period of time, the CPU executes a test reading operation on a disk medium. If no error occurs in the test reading operation, the CPU executes a normal read/write operation requested by a host.

8 Claims, 2 Drawing Sheets

METHOD AND APPARATUS FOR CONTROLLING ACCESS TO DISK UPON DETECTION OF CONDENSATION

CROSS-REFERENCE TO RELATED APPLICATIONS

This application is based upon and claims the benefit of priority from the prior Japanese Patent Application No. 2001-392673, filed Dec. 25, 2001, the entire contents of which are incorporated herein by reference.

BACKGROUND OF THE INVENTION

1. Field of the Invention

The inventions relate to a disk drive in which information recorded on a disk medium is read by a head, and more particularly to a method and apparatus suitable for controlling access to a disk when a condensation sensor incorporated in the apparatus detects condensation.

2. Description of the Related Art

Hard disk drives (hereinafter referred to as "HDDs") are known as representative disk drives in which information recorded on a disk medium is read by a head. The head is supported by an actuator that radially moves the head over the disk medium. Further, personal computers are known as representative hosts (host systems) that use HDDs. Most recent personal computers contain HDDs. Personal computers containing HDDs, in particular, notebook type personal computers of high portability, need to be prepared for both indoor and outdoor environments.

When using a personal computer containing an HDD outside, it is possible, for example, that the ambient temperature will abruptly change from high to low. In this case, condensation may occur within the HDD. If the HDD is used in this state, the HDD may malfunction.

In light of the above, Japanese Patent Application KOKAI Publication No. 10-320902 has proposed a technique (hereinafter referred to as "prior art") for eliminating the problem that is raised when condensation occurs in HDDs. In the prior art, when a condensation sensor employed in an HDD has detected condensation, recording of data to a disk medium or reproduction of data from the disk medium is stopped. Further, the head is retracted to the ramp, and then the rotation of the disk medium is continued for a predetermined period of time. Thus, when the condensation sensor has detected condensation, the recording or reproduction of data is kept suspended until the condensation sensor detects no more condensation. Malfunction of the HDD is thus prevented.

In general, if the surface of the condensation sensor gets wet to the degree that enables detection of condensation, a lot of time is required until the condensation sensor is completely dry. Accordingly, in the prior art, once the condensation sensor detects condensation, recording or reproduction of data is suspended for a long time. However, it is possible that the surface of the head is already dry even if the surface of the condensation sensor is still wet. In this state, no problem occurs if recording or reproduction of data is executed, i.e., if the disk medium is accessed. In the prior art, however, even if the head surface is already dry, it is still regarded as wet until the condensation sensor itself is dry and detects no condensation. Thus, in the prior art, as long as the condensation sensor detects condensation, recording or reproduction of data is stopped even if the head is dry and can record or reproduce data.

SUMMARY

The inventions have been developed in light of the above, and enable a head to promptly access a disk medium a predetermined period of time after a condensation sensor provided in a disk drive detects condensation, and before the condensation sensor itself is dry the prompt access to the disk medium being enabled by confirming, by a test reading operation, whether at least the surfaces of the head and disk medium are dry and the head can access the disk medium.

According to an aspect of the invention, there is provided a method of controlling access to a disk medium when a condensation sensor provided in a disk drive detects condensation, information recorded on the disk medium being read by a head in the disk drive. The method comprises: determining, from a detection result of the condensation sensor, whether condensation occurs in the disk drive; waiting for a predetermined period of time if it is determined that condensation occurs in the disk drive; executing a test reading operation on the disk medium after the predetermined period of time; and executing normal access to the disk medium if the test reading operation succeeds, when a host using the disk drive issues a request for the normal access to the disk medium.

Additional advantages of the claimed inventions will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
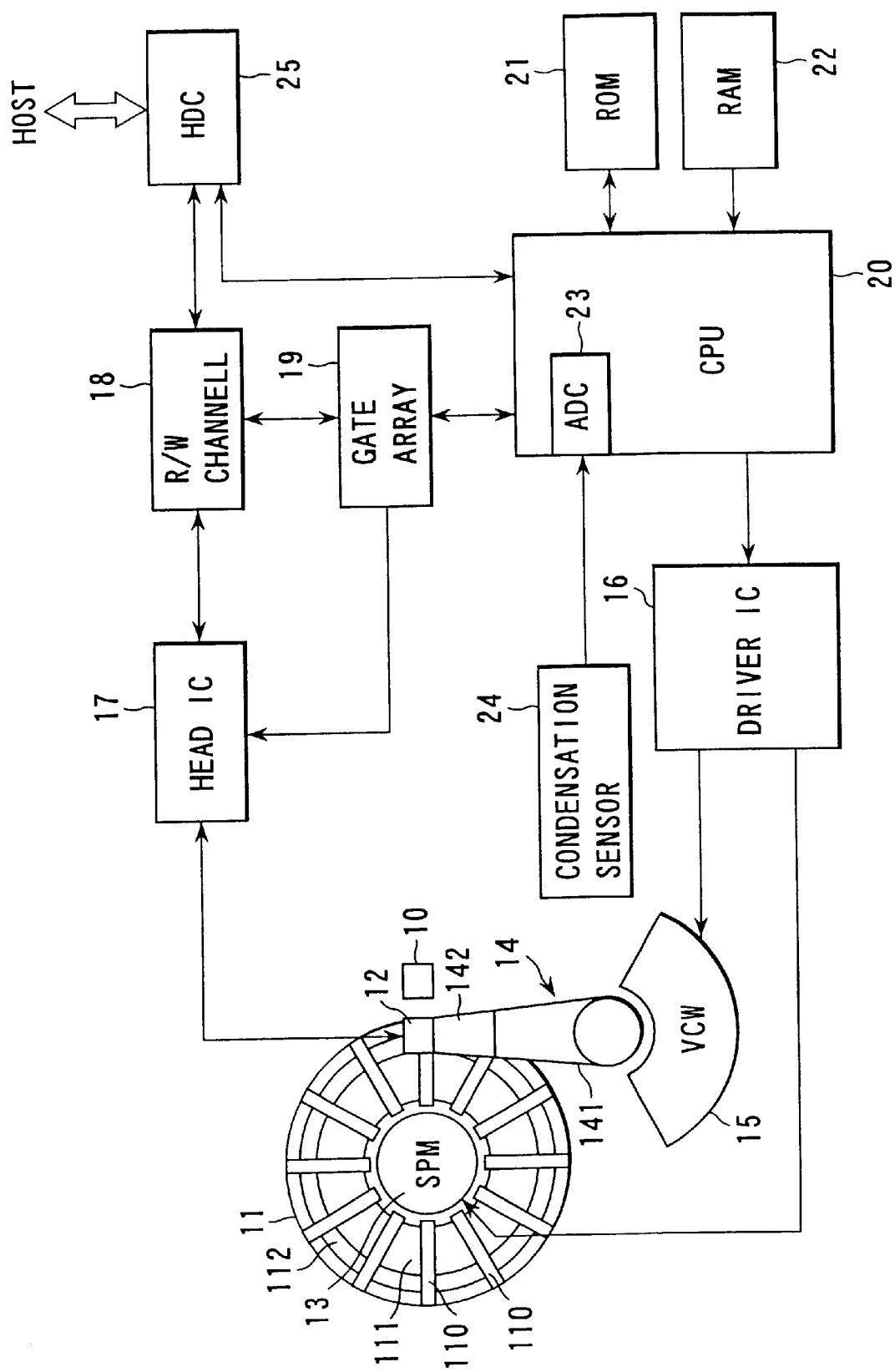
FIG. 1 is a block diagram illustrating the configuration of a hard disk drive according to an embodiment of the invention.

An embodiment in which the present invention is applied to a hard disk drive will be described with reference to the accompanying drawings. FIG. 1 is a block diagram illustrating the configuration of the hard disk drive (HDD) according to the embodiment of the invention. In FIG. 1, a disk (magnetic disk) 11 has two, i.e., upper and lower, surfaces. One or both of the two surfaces of the magnetic disk are used as recording surfaces on which data is magnetically recorded. A head (magnetic head) 12 is provided for each recording surface of the disk 11. The head 12 floats above the disk 11 in accordance with the rotation of the disk 11 when the HDD operates. The head 12 is used to write data to the disk 11 (data recording) and to read data from the disk 11 (data reproduction). Although the HDD shown in FIG. 1 is assumed to have a single disk 11, it may have a plurality of stacked disks 11.

Each recording surface of the magnetic disk has a user area 111 that can be used by a user (host), and a system area 112 that store information necessary for system management (system management information). The system area 112 is used only by the system. In other words, the system areas are non-user areas that cannot be recognized by the user. Further, a plurality of radially extending servo areas 110 are provided circumferentially at regular intervals on the disk 11. Each servo area 110 stores servo data. The servo data includes position information necessary for head positioning control executed to position the head 12 within a target range on a target track. A user data area is provided between each pair of adjacent servo areas 110. Each user data area has a plurality of data sectors (not shown).

The disk 11 is rotated at high speed by a spindle motor (hereinafter referred to as an "SPM") 13. The head 12 is attached to an actuator (carriage) 14 serving as a head moving mechanism. More specifically, the head 12 is attached to a suspension 142 that extends from an arm 141 incorporated in the actuator 14. The head 12 is radially moved in accordance with the swing operation of the actuator 14. As a result, the head is positioned to a target track. The actuator 14 has a voice coil motor (hereinafter referred to as a "VCM") 15 serving as a drive source for the actuator 14. Thus, the actuator 14 is driven by the VCM 15.

A ramp 10 is provided outside the disk 11 for retracting the head 12 when the HDD is shifted to a non-operative state (recording/reproduction-stopped state). Actually, a tab (not shown) formed at the free end of the actuator 14 that supports the head 12 is rested upon the ramp 10 instead of the head 12 itself. However, for facilitating the explanation, it is expressed that the head 12 is retracted to (unloaded to; parked on) the ramp 10.

The SPM 13 and VCM 15 are driven by driving currents (SPM current and VCM current) supplied from a driver IC (Integrated Circuit) 16. The driver IC 16 is a motor driver in the form of an IC chip, and serves as SPM and VCM drivers. The values (control variables) for determining the driving currents to be supplied from the driver IC 16 to the SPM 13 and VCM 15 are determined by a CPU 20.

The head 12 is connected to a head IC 17 mounted on a flexible printed circuit board (FPC) (not shown). The head IC 17 is a head amplifier circuit in the form of an IC chip. The head IC 17 contains a read amplifier for amplifying a read signal read by the head 12, and a write amplifier for converting write data to a write current. The head IC 17 is connected to a read/write channel (hereinafter referred to as an "R/W channel") 18. The R/W channel 18 executes various types of signal processing. The signal processing includes the processing of A/D (Analog/Digital) converting the read signal (analog signal) amplified by the head IC 17. The signal processing also includes the processing of encoding write data and decoding read data. The signal processing further includes the processing of extracting servo data from a digitized read signal in accordance with a timing signal (gate signal) generated by a gate array 19.

The R/W channel 18 is connected to the gate array 19 and an HDC (disk controller) 25. The gate array 19 extracts position information from the servo data detected by the R/W channel 18, and holding it such that the CPU 20 can read it. Further, the gate array 19 generates various timing signals necessary for the data reading/writing in the HDD, the detection of each servo data by the R/W channel 18, etc. The gate array 19 has a group of registers for control (not shown). A part of a memory area in the CPU 20 is assigned to the control register group. The CPU 20 executes data reading and writing on the memory area assigned to the control register group, thereby controlling the gate array 19 and HDC 25.

The CPU 20 is connected to a ROM (Read Only Memory) 21 and RAM (Random Access Memory) 22. The ROM 21 is a non-volatile memory that prestores a control program executed by the CPU 20. The RAM 22 provides, for example, a work area for the CPU 20. The CPU 20 is the main controller of the HDD. The CPU 20 controls each section in the HDD in accordance with the control program stored in the ROM 21. For example, the CPU 20 executes, for example, positioning control for positioning the head 12 within a target range on a target track on the basis of position information extracted by the gate array 19. The CPU 20 also executes a reading operation, called "test reading", a predetermined period of time after a condensation sensor 24, described later, detects condensation. The test reading operation is executed to read a predetermined sector on the system area 112. From the test reading result, the CPU 20 determines whether or not the disk is accessible.

The CPU 20 contains an A/D converter (ADC) 23. The input of the A/D converter 23 is connected to the output of the condensation sensor 24, which is disclosed in, for example, Japanese Patent Application KOKAI Publication No. 10-320902. The condensation sensor 24 is used to detect condensation in the HDD. The CPU 20 determines that the condensation sensor 24 has detected condensation, by reading, from the A/D converter 23, the digitally converted value of the output of the condensation sensor 24. In the embodiment, the condensation sensor 24 is mounted on the flexible printed circuit board (FPC) on which the head IC 17 is also mounted. As a result, the condensation sensor 24 is located near the disk 11 or head 12. The condensation sensor 24 may be connected to the gate array 19 so that the condensation detection result of the sensor 24 is read by the CPU 20 via the gate array 19.

The HDC 25 generates data to be transferred to the host, from the read data decoded by the R/W channel 18. Further, the HDC 25 generates an error correction code from the write data transmitted from the host, attaches the error correction code to the write data, and transmits the resultant data to the R/W channel 18.

Figure 2:
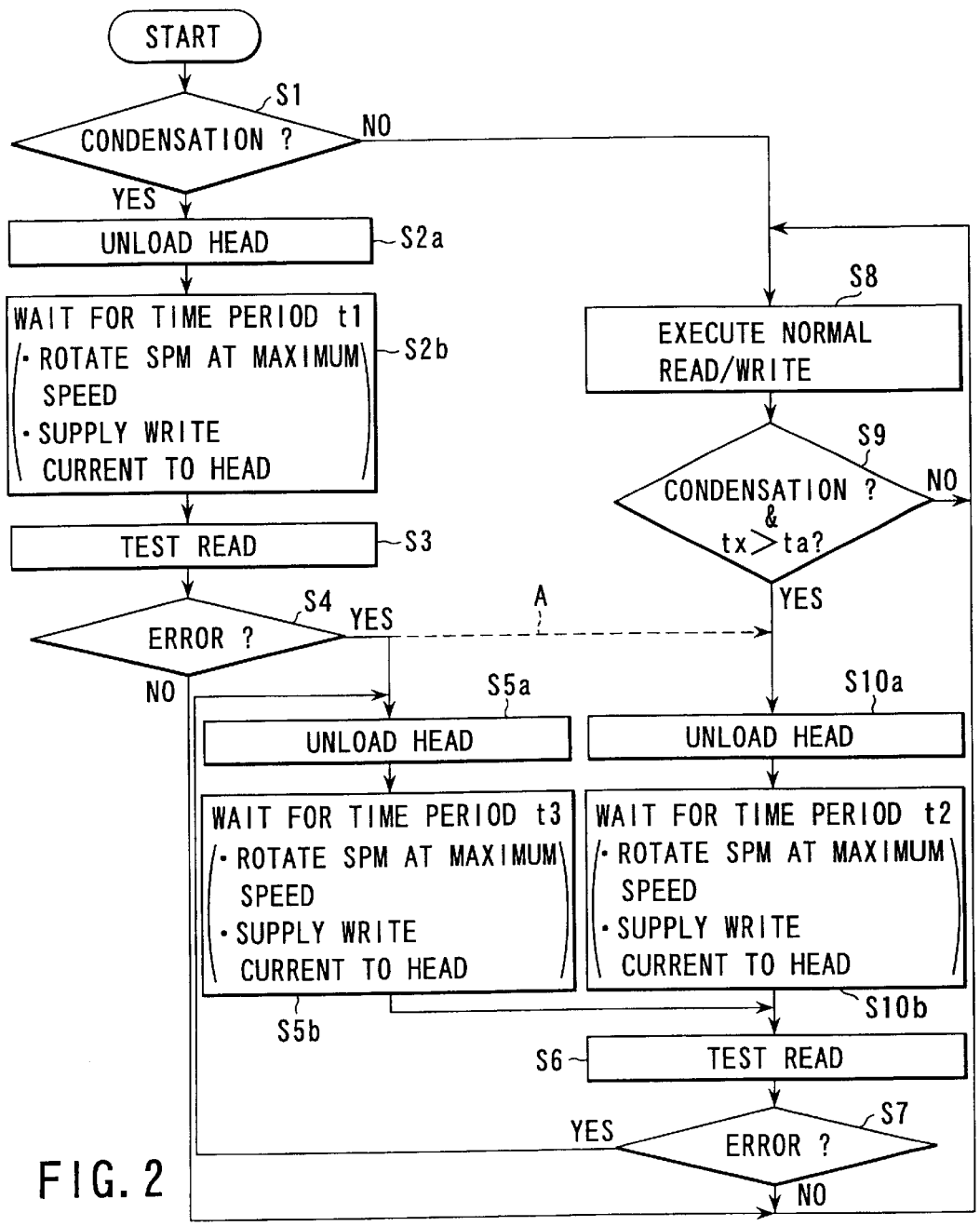
FIG. 2 is a flowchart useful in explaining the operation of the embodiment.

Referring now to the flowchart of FIG. 2, the operation of the embodiment will be described. Firstly, the power switch of the HDD of FIG. 1 is turned on. If the HDD is installed in a notebook type personal computer, the power of the HDD is turned on upon the turn on of the power of the computer.

Upon the turn on of the power of the HDD, the CPU 20 in the HDD executes initialization of the HDD (initialization processing). The initialization processing includes head load control and first seek control. The head load control is executed to move, to the disk 11, the head 12 parked on the ramp 10 when the HDD is in the non-operative state (head loading). The first seek control is executed to move the head 12, loaded on the disk 11, to a predetermined cylinder position on the disk 11. The CPU 20 also reads the output (condensation detection result) of the condensation sensor 24 via the A/D converter 23, thereby determining whether or not condensation has occurred in the HDD (step S1). If there is no condensation, the CPU 20 waits for a command from the host to execute a read/write operation, and executes a usual read/write operation (access to the disk) upon receiving the command (step S8).

If condensation occurs, the CPU 20 executes head unloading control (step S2a). Specifically, the CPU 20 drives the actuator 14 via the driver IC 16 to retract the head 12 from the disk 11 to the ramp 10 (to unload the head from the disk). After that, the CPU 20 waits for the elapse of a predetermined time period t1 (step S2b). The time period t1 is required to increase the internal temperature of the HDD and thereby dry the interior of the HDD. During the period t1, the CPU 20 controls the driver IC 16 at the step S2b so as to rotate the SPM 13 at a higher speed than a standard speed. In this embodiment, the SPM 13 is rotated at an allowable maximum speed (maximum rotational speed). The high speed rotation of the SPM 13 is executed to dry the interior of the HDD, in particular, the surface of the disk 11 as soon as possible. Further, at the step S2b, the CPU 20 controls the gate array 19 for the time period t1 so as to make the head IC 17 supply a write current to the head 12. The supply of the current is also executed to dry the surface of the head 12 as soon as possible. In standard HDDs, a latch mechanism (not shown) is provided to limit the movement of the actuator 14 so that the head 12 will not jump over the ramp 10 when the head 12 is retracted from the disk 11 to the ramp 10. To this end, the CPU 20 supplies a current (VCM current) to the VCM 15 at the step S2b so that the actuator 14 will be pressed against the latch mechanism. This enables the temperature near the actuator 14 to be increased to accelerate the drying of the interior of the HDD, without moving the head 12 from the ramp 10.

As described above, in the embodiment, the step S1 is executed after the head load process (after the initialization processing). This is done in order to execute the same processing at the steps S2a and S2b following the step S1, and at steps S5a and S5b (or S10a and S10b), described later, although the waiting time varies therebetween. However, the step S1 may be executed before head loading during the initialization processing. In this case, it is not necessary to unload the head 12 from the disk if it is determined at the step S1 that condensation has occurred. In other words, the step S2a is not necessary. This is because the head 12 is parked on the ramp 10 when the step S1 is executed. In this case, there is no danger of dew being attached to the head 12 even if the dew exists on the disk 11.

As described above, the CPU 20 rotates the SPM 13 at the maximum speed and supplies a write current to the head 12, for the time period t1 that starts when it is determined that condensation has occurred (step S2b). At the end of the time period t1, the CPU 20 proceeds from the step S2b to the next step S3. At the step S3, the CPU 20 executes the following process. Firstly, the CPU 20 moves the head 12 from the ramp 10 to the disk 11. Thereafter, the CPU 20 moves the head 12 to a predetermined area on the disk 11, e.g. a predetermined track on the system area 112. After that, the CPU 20 reads data from a predetermined sector on the predetermined track, irrespective of whether there is a command to read/write data. This reading operation is called "test reading". Thus, the CPU 20 executes test reading at the step S3.

Subsequently, the CPU 20 determines at the next step S4 whether or not an error has occurred in the test reading at the step S3. If there is no error, i.e., if the test reading has succeeded, the CPU 20 determines that at least the surfaces of the head 12 and disk 11 in the HDD are already dry irrespective of the condensation detection result supplied from the condensation sensor 24. At this time, the CPU 20 waits for a read/write command from the host and executes a usual read/write operation (executes access to the disk) upon receiving the command (step S8).

As described above, in the embodiment, if the condensation sensor 24 detects condensation immediately after the turn on of the HDD, the CPU 20 executes the following control for the time period t1 to dry the interior of the HDD. The SPM 13 is rotated at a higher speed than the standard speed. A write current is supplied to the head 12 when the head 12 is retracted on the ramp 10. After the time period t1, whether or not the interior of the HDD is dry and the disk is accessible is determined not from the condensation detection result of the condensation sensor 24, but from the test reading result. Thus, in the embodiment, before the condensation sensor 24 itself is dry, a usual read/write operation can be executed only if the surfaces of the disk 11 and head 12 are dry.

If an error occurs in the test reading operation at the step S3, i.e., if the test reading operation had failed, the CPU 20 determines that the interior of the HDD is not yet dry even after the step S2b. In this case, the CPU 20 first retracts the head 12 on the disk 11 to the ramp 10 (step S5a). In this state, the CPU 20 waits for the elapse of a predetermined time period t3 (step S5b). The test reading error includes the seek error that the head 12 cannot accurately be moved to the predetermined track on the system area 112 as a test reading target. In the embodiment, the waiting time period t3 at the step S5b is set shorter than the waiting time period t1 at the step S2b. That is, the waiting time period t1 set at the step S2b if condensation is determined to exist for the first time after the power of the HDD is turned on is longer than the waiting time period t3 set at the step S5b if condensation is determined to exist in the second or later determination loop (t1>t3).

At the step S5b, the CPU 20 executes the same process as at the step S2b for the time period t3, in order to dry the interior of the HDD as soon as possible. Specifically, the CPU 20 rotates the SPM 13 at the maximum speed and supplies a write current to the head 12. The CPU 20 proceeds to a step S6 after the execution of the step S5b. At the step S6, the CPU 20 executes, as at the step S3, a test reading operation in which a predetermined sector of the predetermined track on the system area 112 is read. Subsequently, the CPU 20 determines whether or not an error has occurred in the test reading operation (step S7). If no error has occurred in the test reading operation, the CPU 20 determines that at least the surfaces of the disk 11 and head 12 in the HDD are already dry. At this time, the CPU 20 waits for a read/write command from the host, and executes a normal read/write operation upon the reception of the command (step S8).

If an error has occurred in the test reading operation at the step S6, the CPU 20 determines that the interior of the HDD is not yet dry even after the execution of the step S5b. At this time, the CPU 20 again executes the steps S5a and S5b. In other words, the CPU 20 repeatedly executes the steps S5a and S5b until no error is detected in the test reading operation at the step S6, thereby drying each element in the HDD, in particular, the surfaces of the disk 11 and head 12.

After executing the normal read/write operation at the step S8, the CPU 20 proceeds to the next step S9. At the step S9, the CPU 20 determines whether or not condensation is currently detected by the condensation sensor 24, and whether or not a time period tx that starts at a time point t0, at which the CPU 20 most recently determined the detection of condensation by the sensor 24, exceeds a predetermined time period ta. The time period ta is set to, for example, one hour, which is sufficiently longer than the time period required to dry the condensation sensor 24 after the sensor 24 detects condensation. Accordingly, if condensation is currently detected by the condensation sensor 24, and if the time period tx exceeds the time period ta, the following can be considered. Firstly, condensation has once disappeared during the time period ta stating at t0. Secondly, after the condensation has once disappeared, new condensation occurs before or at the present time point (t0+tx), and the new condensation is detected by the sensor 24 at the present time point (t0+tx). This means that the time point t0 is the last condensation detection time point, and the time point (t0+tx) is the detection time point t0 of the new condensation. As is apparent, the time point t0 is where the answer at the step S1 or S9 is YES.

If the answer at the step S9 is NO, the CPU 20 determines that new condensation does not occur, and the surfaces of the disk 11 and head 12 are already dry irrespective of the condensation detection result of the condensation sensor 24. In this case, the CPU 20 determines that the disk 11 is accessible (a read/write operation can be executed on the disk 11), and returns to the step S8. If, on the other hand, the answer at the step S9 is YES, the CPU 20 determines that new condensation has occurred. In other words, the CPU 20 determines that the fact that no error has occurred in the test reading operation executed at the latest step S3 or S6 is not helpful. In this case, the CPU 20 retracts the head 12 on the disk 11 to the ramp 10 (step S10a). After that, the CPU 20 waits for the elapse of a predetermined time period t2 (step S10b). In the embodiment, the waiting time period t2 set at the step S10b is shorter than t1 set at the step S2b and longer than t3 set at the step S5b (t1>t2 >t3). The time periods t1, t2 and t3 are set to, for example, 20, 10 and 5 minutes, respectively.

At the step S10b, the CPU 20 executes, for the time period t2, the same process as at the step S2b or S5b in order to dry the interior of the HDD, in particular, the surfaces of the disk 11 and head 12 as soon as possible. Specifically, the CPU 20 rotates the SPM 13 at the maximum speed and supplies a write current to the head 12. The CPU 20 proceeds to the step S6 after the execution of the step S10b, as in the case where the step S5b is executed. At the step S6, the CPU 20 executes a test reading operation. If an error occurs in the test reading operation at the step S3 or S6, the steps S10a and S10b may be executed instead of the steps S5a and S5b, as indicated by the arrow A in FIG. 2.

As described above, in the embodiment, even when the condensation sensor 24 has detected condensation, if no error occurs in a test reading operation executed after the interior of the HDD is dried for a predetermined period of time (t1, t2 or t3), it is considered that the interior of the HDD is dry. In other words, during a period of time ranging from the end of the aforementioned predetermined time period that starts at the condensation detection time point, to the end of the time period ta that also starts at the condensation detection time point, it is considered that the interior of the HDD is dry, irrespective of the condensation detection result of the condensation sensor 24. At this time, a normal read/write operation is executed. After that, i.e., after the time period ta elapses, if the condensation sensor 24 detects condensation, it is considered that new condensation has occurred after the interior of the HDD is once dry. At this time, a normal read/write operation is inhibited, and a test reading operation is executed after the interior of the HDD is dried for a predetermined period of time (t2).

In the above-described embodiment, only one sector is a test reading target. However, a plurality of predetermined sectors may be used as test reading targets. In this case, the CPU 20 executes control, for example, so that the predetermined sectors will be read in a predetermined order. When any one of the sectors has been read normally, the CPU 20 determines that the test reading operation has succeeded. At this time, the CPU 20 stops the test reading operation, and proceeds to a normal read/write operation (step S8). This can prevent an erroneous determination in which a read error, which has actually occurred for some reason other than condensation, is considered to have occurred due to condensation. When any one of the sectors could not normally be read, the test reading operation is considered to have failed, and a drying process is executed for a predetermined period of time (step S5b or S10b). The number of normally read sectors, which is a condition for determining that the test reading operation has succeeded, is not limited to one. Further, the number of predetermined sectors as test reading targets may be optionally selected, by a user of the host system, from a certain range that limits the maximum number. In addition, the number of normally read sectors, which is a condition for determining that the test reading operation has succeeded, may be optionally selected.

In the above embodiment, inventions are described with respect to HDDs. However, the inventions are also applicable to other kinds of disk drives, such as a magneto-optical drive, etc. It is sufficient if the disk drive is constructed such that information recorded on a disk (disk medium) is read by a head.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of controlling access to a disk medium when a condensation sensor provided in a disk drive detects condensation, information recorded on the disk medium being read by a head in the disk drive, the method comprising:
   determining, from a detection result of the condensation sensor, whether condensation occurs in the disk drive;
   waiting for a predetermined period of time if it is determined that condensation occurs in the disk drive, wherein the waiting occurs when the head is retracted to a predetermined position, wherein the waiting includes rotating the disk medium at a higher speed than a standard speed for the predetermined period of time;
   executing a test reading operation on the disk medium after the predetermined period of time; and
   executing normal access to the disk medium if the test reading operation succeeds, when a host using the disk drive issues a request for the normal access to the disk medium.

2. A method of controlling access to a disk medium when a condensation sensor provided in a disk drive detects condensation, information recorded on the disk medium being read by a head in the disk drive, the method comprising:
   determining, from a detection result of the condensation sensor, whether condensation occurs in the disk drive;
   waiting for a predetermined period of time if it is determined that condensation occurs in the disk drive, wherein the waiting occurs when the head is retracted to a predetermined position, wherein the waiting includes rotating the disk medium at an allowable maximum speed for the predetermined period of time;
   executing a test reading operation on the disk medium after the predetermined period of time; and
   executing normal access to the disk medium if the test reading operation succeeds, when a host using the disk drive issues a request for the normal access to the disk medium.

3. A method of controlling access to a disk medium when a condensation sensor provided in a disk drive detects condensation, information recorded on the disk medium being read by a head in the disk drive, the method comprising:

determining, from a detection result of the condensation sensor, whether condensation occurs in the disk drive;

waiting for a predetermined period of time if it is determined that condensation occurs in the disk drive, wherein the waiting occurs when the head is retracted to a predetermined position, wherein the waiting includes supplying a write current to the head for the predetermined period of time;

executing a test reading operation on the disk medium after the predetermined period of time; and executing normal access to the disk medium if the test reading operation succeeds, when a host using the disk drive issues a request for the normal access to the disk medium.

4. A method of controlling access to a disk medium when a condensation sensor provided in a disk drive detects condensation, information recorded on the disk medium being read by a head in the disk drive, the method comprising:

determining, from a detection result of the condensation sensor, whether condensation occurs in the disk drive;

waiting for a predetermined period of time if it is determined that condensation occurs in the disk drive, wherein the waiting occurs when the head is retracted to a predetermined position, wherein the waiting includes rotating the disk medium at a higher speed than a standard speed for the predetermined period of time, and supplying a write current to the head for the predetermined period of time;

executing a test reading operation on the disk medium after the predetermined period of time; and executing normal access to the disk medium if the test reading operation succeeds, when a host using the disk drive issues a request for the normal access to the disk medium.

5. A method of controlling access to a disk medium when a condensation sensor provided in a disk drive detects condensation, information recorded on the disk medium being read by a head in the disk drive, the method comprising:

determining, from a detection result of the condensation sensor, whether condensation occurs in the disk drive;

waiting for a predetermined period of time if it is determined that condensation occurs in the disk drive;

executing a test reading operation on the disk medium after the predetermined period of time;

executing normal access to the disk medium if the test reading operation succeeds, when a host using the disk drive issues a request for the normal access to the disk medium determining, after the normal access to the disk medium, whether the condensation sensor detects condensation, and whether an elapsed period of time starting at a point in time, at which occurrence of condensation was most recently determined, exceeds a predetermined reference period of time sufficiently longer than a period of time required to dry the condensation sensor;

waiting for another predetermined period of time shorter than the first-mentioned predetermined period of time, assuming that new condensation occurs, if the condensation sensor detects condensation and it is determined that the elapsed period of time exceeds the predetermined reference period of time; and executing another test reading operation on the disk medium after said another predetermined period of time, and wherein the normal access to the disk medium is executed in any one of a case where the condensation sensor does not detect condensation, a case where the elapsed period of time does not exceed the predetermined reference period of time although the condensation sensor detects condensation, and a case where said another test reading operation executed after said another predetermined period of time succeeds.

6. A method of controlling access to a disk medium when a condensation sensor provided in a disk drive detects condensation, information recorded on the disk medium being read by a head in the disk drive, the method comprising:

determining, from a detection result of the condensation sensor, whether condensation occurs in the disk drive;

waiting for a predetermined period of time if it is determined that condensation occurs in the disk drive;

executing a test reading operation on the disk medium after the predetermined period of time;

executing normal access to the disk medium if the test reading operation succeeds, when a host using the disk drive issues a request for the normal access to the disk medium;

waiting for another predetermined period of time shorter than the first-mentioned predetermined period of time if the test reading operation executed after the first-mentioned predetermined period of time fails; and executing another test reading operation after said another predetermined period of time, and wherein:
   the normal access to the disk medium is also executed when said another test reading operation executed after said another predetermined period of time succeeds; and
   the waiting for said another predetermined period of time is also executed when said another test reading operation executed after said another predetermined period of time has fails.

7. A method of controlling access to a disk medium when a condensation sensor provided in a disk drive detects condensation, information recorded on the disk medium being read by a head in the disk drive, the method comprising:

determining, from a detection result of the condensation sensor, whether condensation occurs in the disk drive;

waiting for a predetermined period of time if it is determined that condensation occurs in the disk drive;

executing a test reading operation on the disk medium after the predetermined period of time;

executing normal access to the disk medium if the test reading operation succeeds, when a host using the disk drive issues a request for the normal access to the disk medium; and wherein:
   the test reading operation is executed on a plurality of predetermined sectors;
   the test reading operation is determined to succeed if at least one of the predetermined sectors is normally read; and
   the test reading operation is determined to fail if read errors occurs on all the predetermined sectors.

8. A method of controlling access to a disk medium when a condensation sensor provided in a disk drive has detected condensation, information recorded on the disk medium being read by a head in the disk drive, the method comprising:

determining whether condensation has occurred in the disk drive, from a detection result of the condensation sensor after a power of the disk drive is turned on;

waiting for a first period of time if it is determined that condensation occurs in the disk drive;

executing a first test reading operation on the disk medium after the first period of time;

executing normal access to the disk medium if the first test reading operation succeeds, when a host using the disk drive issues a request for the normal access to the disk medium;

determining, after the normal access to the disk medium, whether the condensation sensor detects condensation, and whether an elapsed period of time starting at a point in time, at which occurrence of condensation was most recently determined, exceeds a predetermined reference period of time sufficiently longer than a period of time required to dry the condensation sensor;

waiting for a second period of time shorter than the first period of time, assuming that new condensation occurs, if the condensation sensor detects condensation and it is determined that the elapsed period of time exceeds the predetermined reference period of time;

executing a second test reading operation on the disk medium after the second period of time; and waiting for a third period of time shorter than the second period of time if one of the first and second test reading operations fails, and wherein:

the second test reading operation is also executed after the third period of time; and the normal access to the disk medium is executed in any one of a case where the condensation sensor does not detect condensation, a case where the elapsed period of time does not exceed the predetermined reference period of time although the condensation sensor detects condensation, and a case where the second test reading operation succeeds.

* * * * *